(12) United States Patent
Marchese

(10) Patent No.: US 9,002,995 B2
(45) Date of Patent: Apr. 7, 2015

(54) ELECTRONIC SPACE AND METHOD FOR PROVIDING RESOURCES TO FACILITATE IDEATION

(76) Inventor: Leonard E. Marchese, Newtown, CT (US)

(*) Notice: Subject to any disclaimer, the term of this patent is extended or adjusted under 35 U.S.C. 154(b) by 302 days.

(21) Appl. No.: 13/588,444

(22) Filed: Aug. 17, 2012

(65) Prior Publication Data

US 2013/0007637 A1    Jan. 3, 2013

Related U.S. Application Data

(63) Continuation of application No. 09/613,980, filed on Jul. 11, 2000, now abandoned.

(60) Provisional application No. 60/144,407, filed on Jul. 16, 1999.

(51) Int. Cl.
G06F 17/30 (2006.01)
G06F 3/0481 (2013.01)
G06F 3/0482 (2013.01)

(52) U.S. Cl.
CPC ........ *G06F 17/30061* (2013.01); *G06F 3/0481* (2013.01); *G06F 3/04815* (2013.01); *G06F 3/0482* (2013.01)

(58) Field of Classification Search
CPC .................... H04L 29/06; H04L 29/08072
USPC ............ 709/201, 203, 220, 227, 204, 205; 713/187
See application file for complete search history.

(56) References Cited

U.S. PATENT DOCUMENTS

| | | | | |
|---|---|---|---|---|
| 6,044,393 A | * | 3/2000 | Donaldson et al. | 718/100 |
| 6,175,842 B1 | * | 1/2001 | Kirk et al. | 715/205 |
| 6,233,600 B1 | * | 5/2001 | Salas et al. | 709/201 |
| 6,570,563 B1 | * | 5/2003 | Honda | 345/419 |
| 8,055,907 B2 | * | 11/2011 | Deem et al. | 713/187 |

* cited by examiner

*Primary Examiner* — Khanh Dinh
(74) *Attorney, Agent, or Firm* — William J. Sapone; Ware Fressola Maguire & Barber LLP

(57) ABSTRACT

A method and system are provided for organizing and assembling information and resources for display as part of an electronic space supported on a network. The electronic space preferably resembles a room. The room is decorated with selected images that may be iconic representations that activate links to specific resources such as databases, technical information, word processing applications, etc., that are user selected to support idea conception and evaluation to promote creativity, innovation and improved problem solving. The electronic space enables a user to customize an on-line workplace with decorations as well as active links to selected resources which may include human resources such as colleagues, co-workers or expert.

11 Claims, 7 Drawing Sheets

ELECTRONIC SPACE AND METHOD FOR PROVIDING RESOURCES TO FACILITATE IDEATION

CROSS REFERENCE TO RELATED APPLICATIONS

This application is a continuation of U.S. patent application Ser. No. 09/613,980, filed Jul. 11, 2000, which claims priority in U.S. Provisional Patent Application No. 60/144,407 filed Jul. 16, 1999, the contents of which are hereby incorporated by reference.

TECHNICAL FIELD

This invention relates to a method for facilitating ideation and creative problem solving by providing a personal electronic space accessible via an intra-net or internet with the electronic space being user configurable and linked to resources for access by a user.

BACKGROUND

The internet is a medium that provides a means for communication via e-mail and for commerce via various web-sites. Presently, a user can search the web to conduct research on various topics, locate various commercial products and services and access various data bases. While increasing the ease of access, there is no system in place to promote effective organization of such information and application of knowledge to assist an individual in creative problem solving, and to achieve business improvement through innovation, collectively referred to herein as ideation, i.e., the act of forming or conceiving of ideas.

Creative problem solving generally requires an identification of the problem, a focus on underlying facts and assumptions, a break to allow this information to gel, then the identification of various options that may offer a solution, and, a review of the options to identify the option for implementation.

Business innovation generally requires an identification of the desired outcome, a focus on facts and underlying assumptions, allowing this information to gel, the identification of various options for a solution, and, a review of the options to determine the best and most relevant option for implementation.

At present, there is no way to utilize on-line resources in anything but a piecemeal fashion, nor is there any way to integrate interactive exchanges with these resources in an organized fashion. For example, one can search for articles related to a specific topic but this is merely a resource, not a means to enhance the problem solving/creativity process.

SUMMARY OF THE INVENTION

It is an object of the present invention to provide an electronic space which can be personalized by the user to facilitate creative problem solving.

It is a further object to provide a system for facilitating creative problem solving by providing a customizable electronic space having integrated therein access to selected resources and/or a support network to assist the user in each step of the problem solving process.

These and other objects of the present invention are achieved by a system comprising an electronic space supported on a network, the space being accessible to a user via the network, the electronic space being user configurable and having active links to selected resources and software applications optionally from the group consisting of databases for conducting research, technical consultants, and consultants on problem solving, etc., the space configured and personalized to include selected displays optionally from the group consisting of art, music, games, books and videos, to facilitate alternate stimulation during the ideation process and, means to stimulate interaction between the user and the system, the selected resources used to facilitate the ideation process. Among the interactions available to stimulate ideation is interaction between users, to "brainstorm" and assist each other in the problem solving efforts.

Using the present invention, a user has immediate access to a unique electronic space where problem solving and/or innovation are facilitated, giving the ability to advance creativity, accelerate innovation and to improve productivity. The system is readily adaptable to promoting interaction between users focused on a specific problem or goal, each having their own electronic space and the group having a "common" electronic space where brainstorming and interaction are facilitated. Thus, substantial time is saved in ideation and implementation and, with increased interaction and immediate access to supportive resources, better solutions are obtained.

DETAILED DESCRIPTION OF THE INVENTION

The present invention is directed to an electronic space configured to support ideation by promoting creative thinking, problem solving and innovation. The electronic space can be hosted on diverse platforms accessible via internet, intra-net, extra-net, etc. using any applicable web connecting device or system. For example, a net enabled personal digital assistant can be used to access the electronic space when a thought or idea of relevance is fresh in the mind. This is a particular advantage of the electronic space for ideation in that it is a pervasive system, accessible from anywhere at any time. Many ideas/solutions, are created "off line" that is, away from the work area, at odd times. Having ready access to the electronic space, one can enter the ideas and begin testing for feasibility/practicality, etc., or use the idea to evolve prior proposed solutions.

While the electronic space is user configurable, it has several basic functions. The first is engagement or activation. A user enters the space and the system issues a message so that the user is engaged by the message upon arrival with a phrase, puzzle or problem, or a request that the user pose a phrase, puzzle or problem for consideration by the system. This places the user in the ideation/problem solving mode. The user may, optionally, skip this and enter directly into their personally configured electronic space.

Many of the interactions are programmed in the application software supporting the system. For example, upon entry, the system automatically triggers a greeting and poses the engagement message which can be a random generated problem/puzzle, quiz, question, etc. for ease of illustration. This type of interaction will be referred to as being with an intelligent agent, meaning this is a computer supported interaction between a user and the system. The intelligent agent may be configured to route requests, perform searches, distribute information, etc., all of which can be configured using conventional programming within the skills of those familiar with application software. Preferably, a system monitor/facilitator is available to oversee and work in concert with the intelligent agent, so a human presence is available to the user for locating certain resources not available through the intelligent agent, for assistance in configuring the space or to guide the user on efficient utilization of the intelligent agent, or to respond when the intelligent agent receives an inquiry it is not programmed to respond to.

Figure 1:
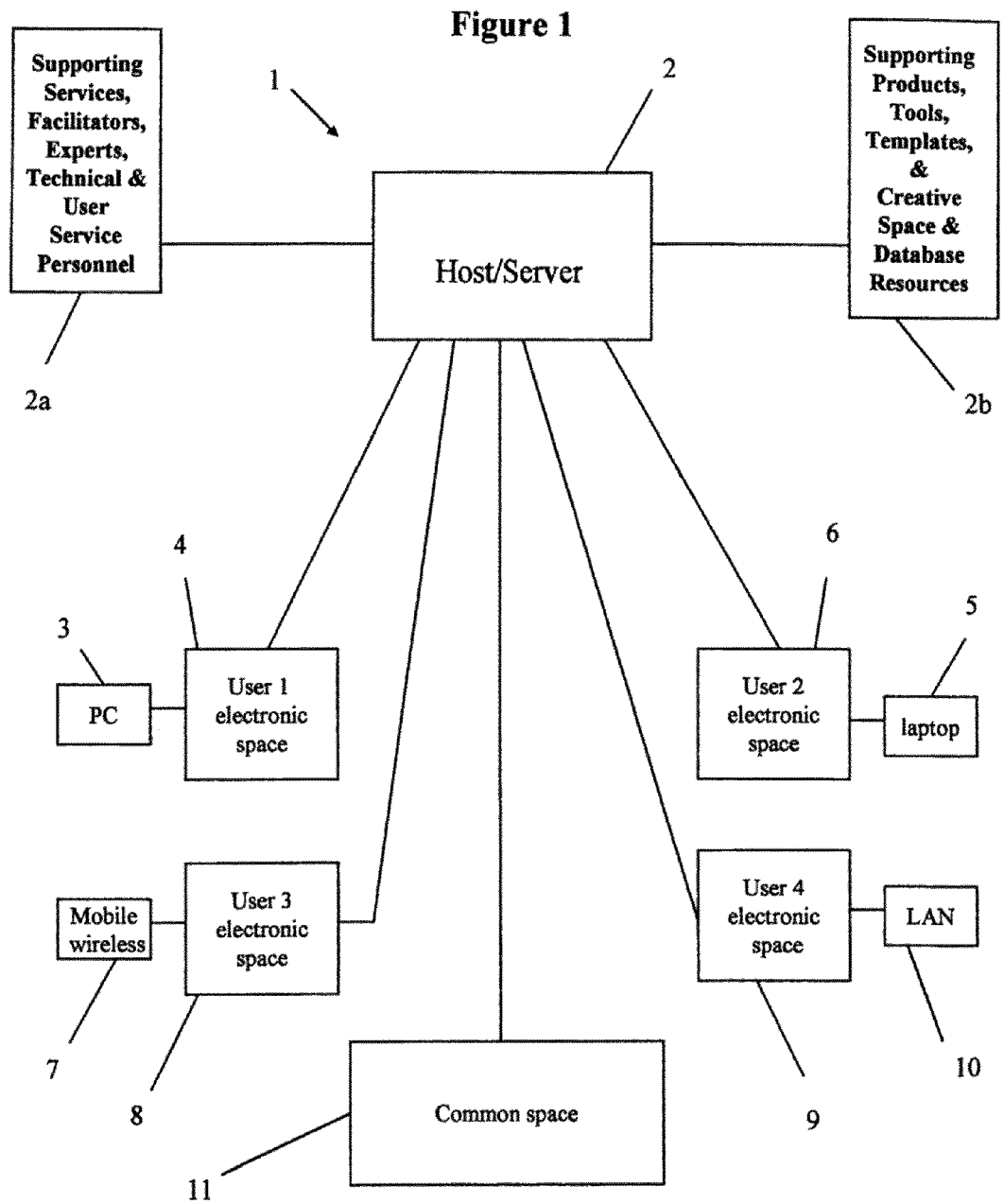
FIG. 1 is a view of an exemplary four user system.

Referring to FIG. 1, a typical system 1 in accordance with a present invention is shown. For illustrative purposes only, this is shown as a four user system though of course the system will be capable of supporting numerous uses. For example, all the employees of a company could be users, these further broken into interactive groups such as those in one department, or into other groups such as a task force assigned to one particular project. Such groupings can include non-employees such as consultants, customers, etc., providing a ready way to "assemble" a group for ideation/problem solving, even if physically located at diverse locations.

The system 1 has a host server 2 that may be accessible via the internet or be located on an Intranet or extranet. While one server is shown, this is for illustrative purposes only and the software supporting the system can be located on diverse platforms and likely will be to optimize support of a multiuser system.

The host server acts as a gatekeeper to a wide variety of resources 2a and 2b and undertakes the processing necessary for preparing and displaying the electronic space and for managing the interactive process and provision of resources. A storage medium is incorporated to save the user configuration, though this may be locally distributed, i.e., saved on the user's personal computer. In any event, memory as well as processing and communicating capability are incorporated into the system. In FIG. 1, a first user has a desktop PC 3 that has access, via intranet, or internet to an electronic space 4 supported via the host server 2. A second user has a laptop 5 for accessing their electronic space 6. A third user has a mobile wireless communication device 7 that is configured to access their electronic space 8. A fourth user accesses their electronic space 9 from a local area network 10.

In this embodiment of the invention, the host server supports a common electronic space 11, akin to a conference room, so that the four users can electronically meet in the conference space to address a common problem or project, the common space similarly being user configured. This space may be decorated and in one embodiment may be an interactive virtual reality electronic space, users represented by avitars when present in the conference room. It is expected that such a common space, though not necessary, does provide for a unique "face to face" type of meeting that clearly can facilitate promoting interactive ideation, problem solving and innovation.

Of course, each user electronic space may also be configured for virtual reality presentation as an option, though the use of virtual reality is not necessary for the practice of the present invention.

The user electronic space 4, as an example, is configured by the user to represent a room that may have paintings, music and a setting comfortable to and unique to that user. Of course, once configured, the room's features are stored on the system. The room has buttons or other switches to activate selected capabilities which include searching, news, messaging, links to user selected electronically accessible sites, stories, quotes, games, puzzles and drawings. In addition, there are tools for supporting ideation using system generated creative questions, system generated reverse thinking, means for producing reports, graphics, spreadsheets and presentations, and means for interaction with selected persons such as those on a team working on the same problem.

Figure 2:
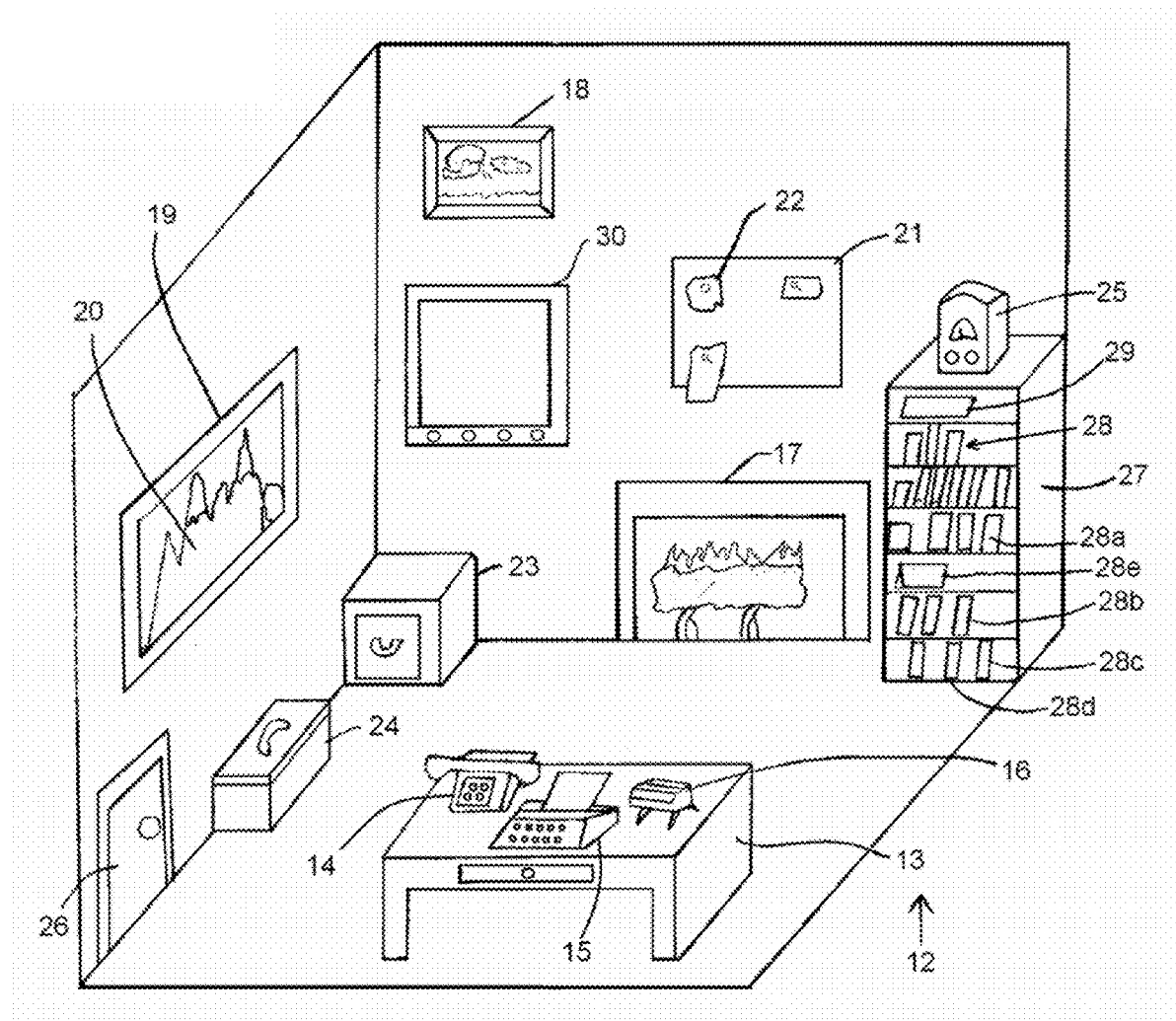
FIG. 2 is an illustrative view of a user electronic space.

Referring to FIG. 2, an exemplary user electronic space viewed as a room 12 is shown, though it must be understood that a wide variety of variations is possible from electronic space to electronic space. This room thus is only offered to illustrate the capabilities of the system as possibly configured by one user, and the invention should not be taken as limited thereto.

The electronic room space 12 has an arrangement of images that act as decorations as well as functioning as links to various resources and applications. For example, the room is configured as an office having a desk 13 with various items on it. A phone image 14 is in fact an iconic image representing a link to a communication menu with choices such as for communicating by e-mail, voice or other means. A typewriter image 15 is an iconic image representing a link to a writing resources menu which may include a word processing application, spread sheet or presentation software. A rolodex image 16 may be an iconic image representing a menu with a list of links to persons, websites, companies, or simply be a list of selected addresses.

The room has a fire place image 17 as a decoration, as well as artwork such as a painting 18, and a window image 19 showing a mountain landscape 20. These images can also function as links. For example, using a graphic pointing device such as a mouse and clicking on the painting 18 can transport the user to a personalized museum, with selected art, photographs, etc. The window image landscape 20 can be a link to that site, replacing the electronic room space with a full display vista such as of the mountain landscape showing a sunset, a sunrise, etc. that can possibly be navigated, or simply exist for from 10 seconds to several minutes as an "escape" from the office. This can also function as a screen saver when the electronic space is not activated for a predetermined length of time. Sound effects can accompany the landscape image.

The room has a bulletin board image 21 where notes 22 are posted, and possibly mail from others. This can be clicked to read/write quick notes.

A file cabinet 23 is an iconic image representing the storage of various project files or reports, including relevant research for example for a particular project, opening the drawer provides a menu of stored files.

A tool box image 24 is an iconic image representing the location of a menu of tools selected by the user, if not represented by a specific separate iconic image, such as the morphing feature described below.

A radio image 25 is an iconic image representing a menu of selected music if that is desired.

A doorway 26 provides an exit from the electronic space.

A bookcase image 27 contains iconic books 28 which each act as a link to various selected resources. For example, one book 28a leads to news items, another book 28b to a technical reference, another book 28c to a search engine, etc. These can also be portals for accessing "people" resources, such as a problem solving coach, a technical expert, an attorney, a financial expert or accountant, etc.

Other doorways or a hallway image can be incorporated as iconic images representing movement to secondary electronic space displays. For example, a doorway to a mall shopping for a menu of items to purchase to promote problem solving, innovation or to provide physical raw materials for the user, or a doorway leading to a secondary electronic space which may be another room, but equipped differently. For example, a room configured to simulate a library for research or a laboratory for testing that has specific user selected technical resources. Of course, a doorway can be provided to lead to the conference room, or other user electronic spaces so visitors can be received in a personal electronic space for direct two-way interaction.

This is best facilitated as a hallway image, the doorway 26 instead of providing an exit, leading to an electronic hallway with multiple doors, each team member having a door that a user can "knock on", i.e., the space is queried if a visitor is permitted to enter their personal electronic space. Some doors may lead to shopping, etc. as described above.

A game image 29 is an iconic image representing a menu which links to a specific game or to a list of games, to provide a break to allow the user alternative stimulation to allow information to "gel".

A TV image 30 is an iconic image representing a link a specific selected video, such as a movie clip, or a menu with a list of video's available for viewing.

The compendium of options enables one to select a comfortable yet stimulating environment for tackling problems, with readily available resources, to test and perfect solutions.

Figure 3:
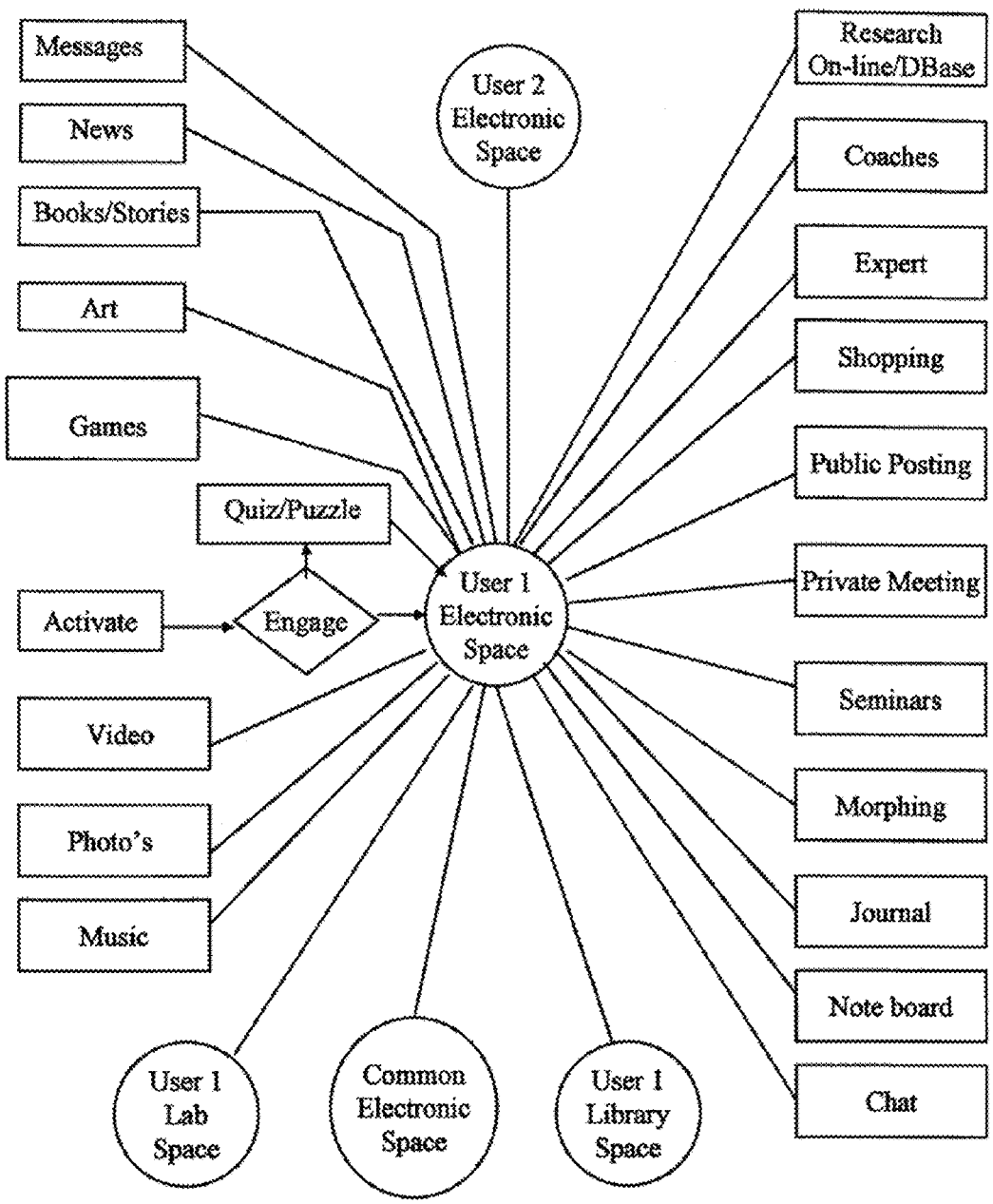
FIG. 3 is an overview of the structure for a typical electronic space; and,
FIG. 4a-4d are block diagrams showing the electronic space topography and flow.
Figure 4A:
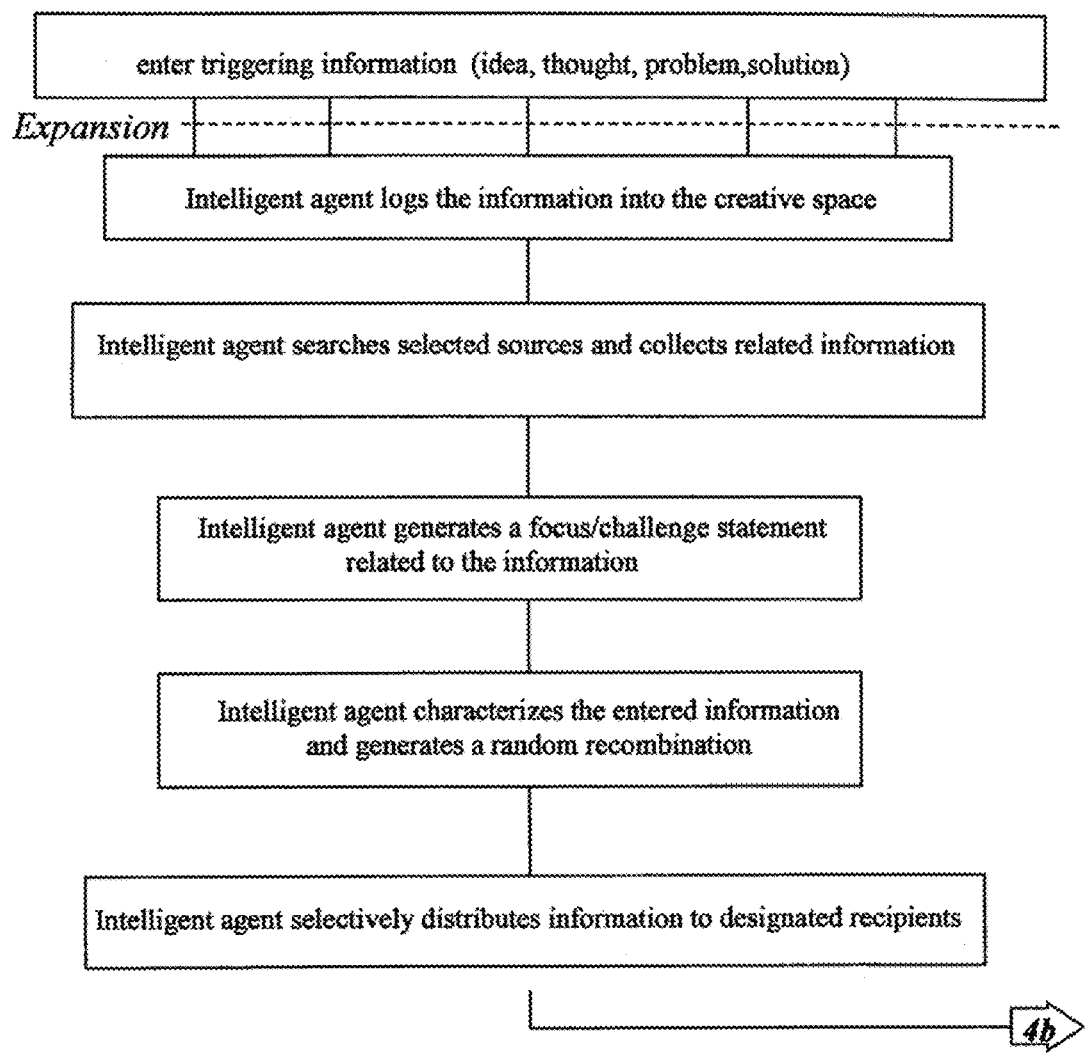
Figure 4B:
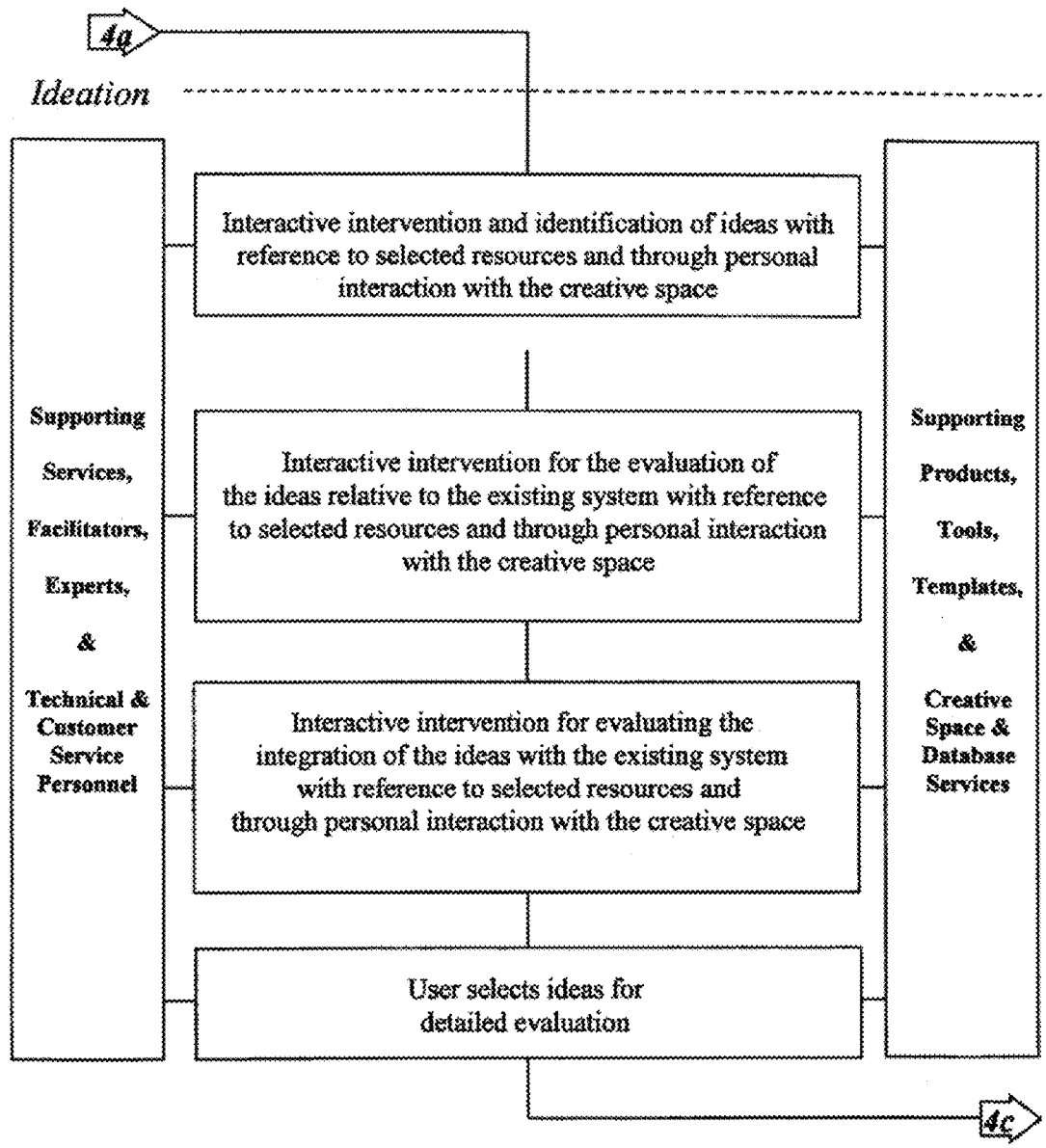
Figure 4C:
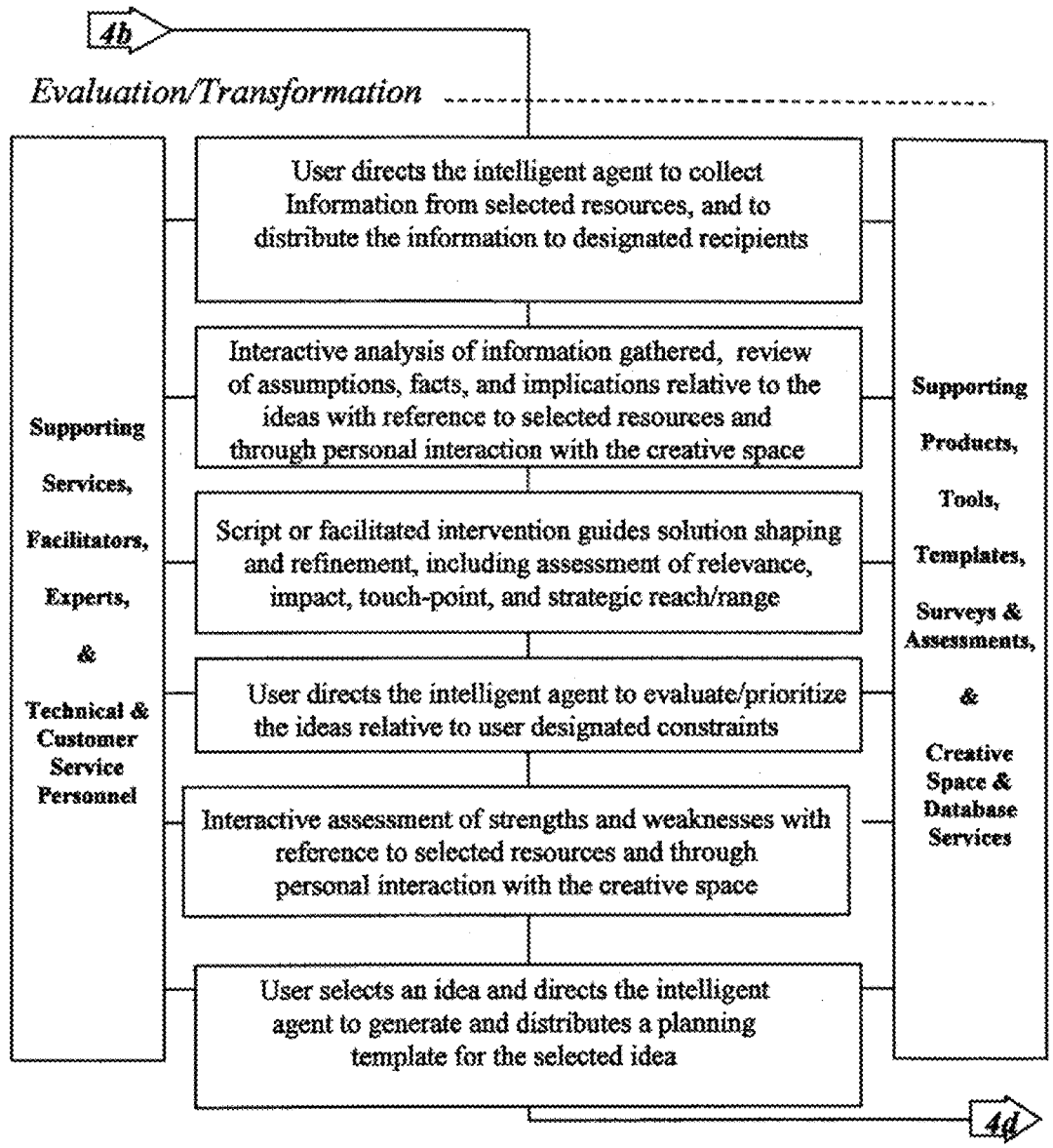
Figure 4D:
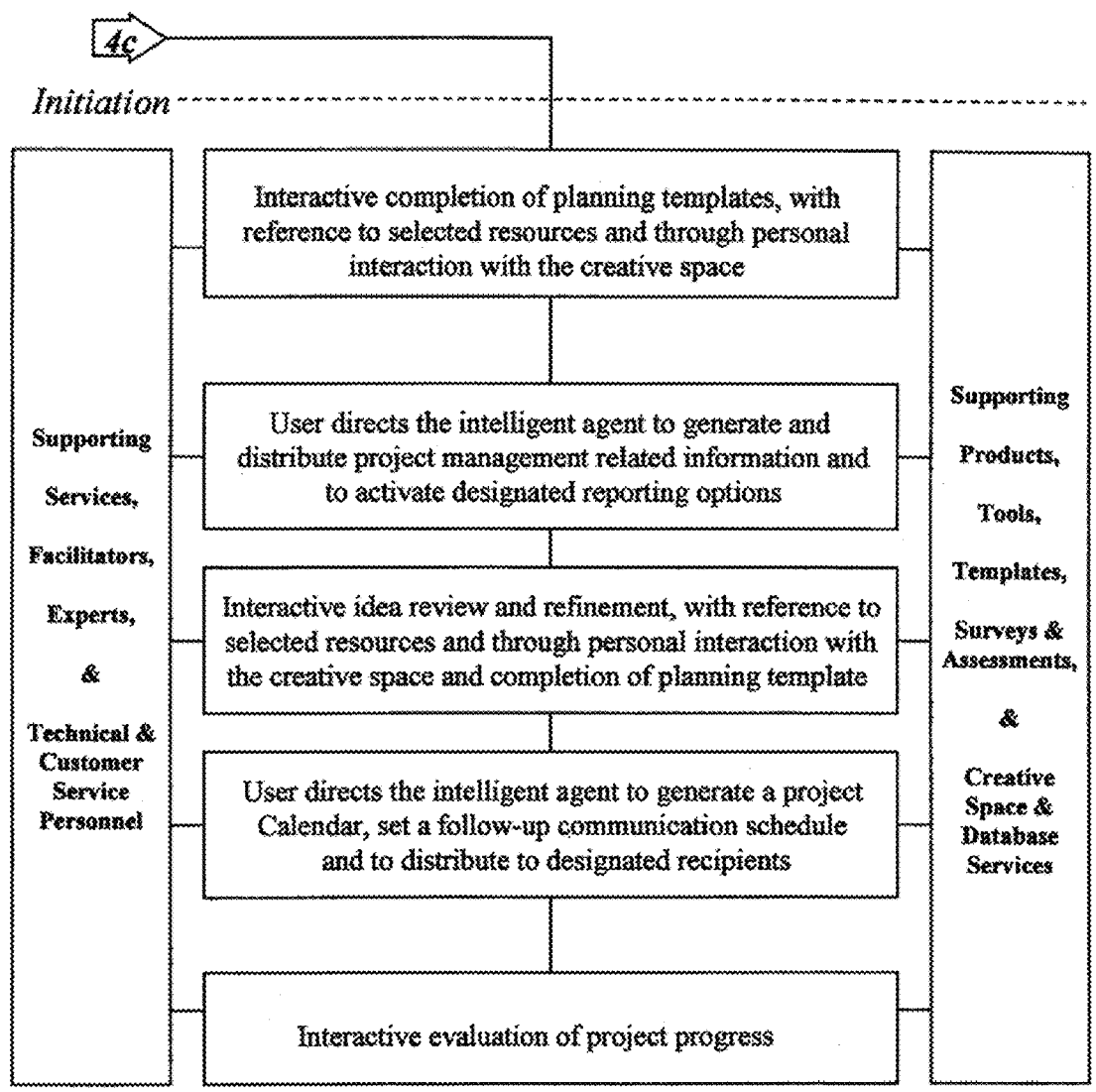

Referring to FIG. 3, an overview of the features supported on the electronic space system illustrates the comprehensive nature of the electronic space and the unique individual combination of resources, stimulation, and contacts that foster facilitates ideation by creativity and innovation, as well as idea implementation.

In a preferred embodiment, a user enters triggering information to activate the system. This can be a simple sign on or be an idea, thought or problem. The intelligent agent engages the user upon arrival with a phrase, puzzle or problem, and/or request that the user present a phrase, puzzle or problem for consideration. This may initiate an interactive discussion with the user and the system support staff. Preferably this would be followed up by a feedback interaction to stimulate a dialog to facilitate user entry and utilization of the electronic space.

The electronic space, once customized with links and "decorations" can further include tools for articulating and studying ideas. These tools could include means to produce reports, story boards, graphics, etc., which can be studied or sent to others for consideration, such as either a technical expert, another person working on the same problem or someone else who can assist the user. In one embodiment of the invention, a 24-hour system support group assists users in locating database resources, technical consultants, to arrange on-line meetings to consult on ways to creatively address the ideation process, to assist in modifying or redecorating the electronic space or to simply provide interaction for the user.

The electronic space has means for storing spontaneous as well as generated ideas preferably in an idea library represented as its own electronic space or in a journal represented as another book image 28*d*. A morphing function that may be represented by another image 28*e* is provided where an idea is sent to the system for reformulation such as by selected support staff or by the system intelligence agent using for example artificial intelligence. The idea statement is transformed or changed and then is returned to the user for consideration.

For example, the user submits an idea to the artificial intelligence to metamorphosize ("morphing") the idea allowing the idea to be reshaped in ways that may suggest other alternative solutions. It is important in problem solving to take ideas and allow them to branch out in different directions to create other options. The more diverse options created for the user, the more likely that a solution can be developed and morphing the idea via computer interaction can assist the user in looking at the idea in a new and different way.

When the system is located on an intranet, that is, privately set up, for example, for use by those in one department, private problem solving can be undertaken using a virtual group electronic space, akin to a conference room but accessible from diverse locations by those individuals tasked with working on a specific project. Such a system is for employee use only as a way to stimulate interaction between employees in different locations, or even next to each other, as the customized electronic space can become a refuge from the office environment Each can have their own electronic space and then contribute to creating this common electronic space, including a similar or expanded selection of support services and links as described above. The personalization improves morale, teamwork and stimulates interaction between employees in different locations, or even in the same location by providing a common electronic space where they can interact together. This increases productivity, and improves the quality and profusion of creative solutions, while providing access to resources dedicated to stimulating, testing and analyzing these solutions.

For example, after meeting and brainstorming in the common electronic space, an agreed solution can be submitted to an outside expert for review and comment.

By creating a personalized electronic space, more akin to a private room, a user can decorate the space to enhance comfort and ease of use, while obtaining links to resources and personal support to promote creative problem solving.

In one embodiment, users of the electronic space can chat with other users having electronic spaces, in groups or in private chat rooms, and discuss particular problems to foster the problem solving process. In essence, users who are seeking solutions to problems can brain storm with each other and therefore assist each other in determining solutions.

The creative space is designed to engaged a user in rethinking, idea generation, intellectual capital development, and the innovative problem solving process.

Each user will have the ability to interact via the electronic space with other users, to navigate to possibly fee-based services for conducting research to facilitate patent and trademark searching and registration to access distance learning to schedule facilitated sessions in an electronic space or to obtain personal coaching.

The invention may be available through a web site located on the internet where a user can subscribe or pay "rent" for the electronic space. The links to resources can be paid on an as used basis, or there can be a suitable amount incorporated into an overall rent fee. The web site itself would be freely user assessable and contain common areas and free sites that would provide an introduction to how the electronic space and method are used to promote ideation.

Referring to FIG. 4*a*-4*d*, the steps involved in a typical use of the electronic space is shown, beginning with activation by entering triggering information, expansion using selected resources and interaction with the intelligent agent, ideation using selected resources to clarify the issues and promote conception of various ideas, the system providing resources and interaction for preliminary idea evaluation, then supporting evaluation/transformation of the ideas to lead to a selected idea, and then using further interaction and selected resources to initiate a project and evaluate the progress made using the selected idea.

Having a customized electronic space, organization of resources is accomplished as well as providing access to resources that might otherwise not be available. The speed at which generated ideas are conceived, evaluated, discarded/selected/transformed is substantially increased, leading to implementation of ideas that are more rigorously tested and thus more likely to succeed in providing the desired outcome.

The invention is a system for organizing and assembling selected information and resources to facilitate ideation comprising an electronic space supported on a network and accessible via network enabled devises, the electronic space having means to link to resources such as databases for conducting research, technical and legal consultants, experts on problem solving, computation software and search services. The electronic space is customizable to enable personal or group preferences for display, active links, interaction, as well as being able to support private use by an individual.

Users may engage each other to motivate the problem solving process. In essence, those who are seeking solutions to problems can interact electronically to brainstorm and assist each other in conceiving ideas. This may include real-time dialogue and video conferencing with colleagues, guest speakers, experts, or other users.

The electronic creative space can provide access to various online or off-line products and services which may be purchased on an as-used basis, or incorporated into a selected subscription plan such as distance learning services, workshops, special events, newsletters, and related products.

The inventive method promotes creative problem solving by providing an electronic space on a network, the space being accessible to a user via the network, the electronic space being configurable to provide user selected links for connecting to resources which may come from the group consisting of databases for conducting research, technical consultants and consultants on problem solving, calculation and computation software and search services, etc. and configuring the electronic space to personalize the electronic space to an individual user by displaying selected art, music, games, videos, quotations and books, to simulate a personal room, The system has means to engage a user of the electronic space and to interaction with the user to stimulate the ideation.

An important feature is the provision of an extensive selection of music, colors and patterns, stories, quotes, video snippets, sounds, inspirational messages, personal photographs, and games and puzzles that may be stored up to a maximum capacity established for the user's private electronic space, which can vary relative to their subscription level or rent paid.

The inventive method may further include providing access to a dispatcher for locating resources for the user, providing tools in the electronic space for the user to create reports, graphics, letters, presentations, etc., providing access to an artificial intelligence based system for morphing a proposed solution into one or more changed solutions, providing access to other users of similar electronic space via group chat spaces or common areas or via private chat rooms, include providing means for video conferencing with technical consultants, dispatchers, or other users, etc.

The inventive method may include accessing the electronic space via any of a number of devices configured for network or web access.

While the invention could be arranged as an internal system for private users, it may also be a paid for service in which the electronic space is rented, with resources charged on an as-used basis or via a roll-in to the monthly charge, i.e., the more storage space, auxiliary rooms or resources on call, the higher the "rent".

The present invention promotes innovation. When a user engages the electronic space, their option selection settings activate and trigger a process for facilitating idea conception. Basically, the process follows three steps: 1) create an idea; 2) bring the new idea to life, that is, evaluate how the new idea changes and advances the goal; and 3) align the idea with the existing structure.

The first step is facilitated by applying existing knowledge and creativity. However, capturing the discovered idea that arises while interacting with the electronic space and communicating with others delivers real value and allows innovation to thrive.

Understanding the implications of new ideas is what separates the best option from other options. Immediate access to resources and dialogue with others is the best way to find the best options, as others will view the option from different perspectives and can point out strengths and weaknesses. A user then learns the impact of the idea and what changes are required. By interaction, use of the resource tools and research, and the user can analyze, enhance and reshape the idea, and plan for implementation.

The generation of new ideas combined with problem solving techniques and tools in a collaborative creative electronic space enable truly innovative solutions. The resulting solutions offer greater competitive reach, business relevance, employee vitality and customer value. When users interact, the process and results are enhanced by their contributions and using the electronic space, much more immediate, substantially increasing productivity.

The intelligent agent may engage a user to define a "challenge statement" to focus the ideation process, using a question/answer approach, and then test assumptions to enable the user to see any weaknesses. An energetic problem solving session usually produces many ideas, requiring participants to step away and let their thinking gel This is facilitated through the use of stories, video snippets, quotations, music, sounds, games and puzzles. The electronic space offers a private Idea Library of journal for storing ideas and solutions-in-progress until the process restarts, and a bulletin board for pinning up ideas that require further thought. Idea refinement is facilitated through brainstorming, forced ideas, reverse thinking, and creative questioning.

The electronic space also allows a user to develop, share, and upload a vision for their success. The electronic space provides templates and a stepwise process for facilitating developing a vision. Additional templates may also be available to facilitate translating the vision into a strategy.

It is critical in problem solving to take ideas and put them in concrete form before they disappear. When discovery occurs, the creative electronic space helps the user apply methods for assessing the relevance and value of the solutions. It's one thing to resolve "why" a solution may work, but it is more important to characterize and assess a solution's benefits. The electronic space provides the resource for a "reality check" step of the problem solving process by assessing strengths and weaknesses, viability and value.

A system monitor may act as a dispatcher to take requests for access to technical expertise. The dispatcher then locates an expert and arranges for online interaction. The dispatcher is part of a support group, which helps users locate specific database resources, technical resources, or experts; facilities effective use of the problem-solving process; and assists users to modify, simplify or reconfigure the electronic space.

After selecting and prioritizing viable value-producing solutions, a plan for implementing a solution is required. The common electronic space can support such planning, as one can conduct group sessions. This capability fosters communication and enhances gaining commitment, as the ensuing communication works toward improving efficiency for making solutions real.

The electronic space may be configured in any manner to unite individuals, teams, companies, etc., to facilitate co-creation and co-development of ideas and solutions, i.e., creation of a task force focused on resolving a specific immediate problem. The electronic spaces can be configured for an affinity group, can function as an internet portal (single access to multiple resources), internet content/service provider (hosting websites with an affinity to creativity and innovative problem solving), virtual intranet or extranet (access to private or shared resources by identified members of the affinity group), a virtual community (a space on the internet for creativity and innovation), or a one-stop-shop (the creativity e-commerce space). Affinity grouping does not preclude the ability of individuals and organization to collaborate to enrich their thinking for their own benefit as their private creative space remains available.

The electronic space may be active on any electronic device capable of connecting to the Internet. This facilitates the recording of ideas when they arrive (usually when not expected); opening a dialogue to quickly address an issue; embellishing an idea or solution in progress; or the recording/archiving of information relevant to motivating creativity, or that may be used at a later time to generate ideas or solve problems.

The electronic space may be engaged through an icon, voice, or touch. The active electronic space may be partitioned to further expedite the activation of a specific electronic space function.

The electronic space may be integrated with the business workflow; allowing creativity and problem solving to be pervasive throughout the business value-chain; from business to business to customer. This facilities quickly collaborating to accommodate a customer's special needs or resolve a problem.

The electronic space may use a series of templates to structure the initiative, establishing relevant measures of success, and assigning roles and responsibilities, reinforced by the option to link or export a solution to project management tools, with the capability to compare defined performance measures relative to actual results. A report generator can show the progress made on the project.

Traditionally, individuals in business attend training sessions or facilitated group meetings to brainstorm and develop solution, on the spot, and usually in a constrained period of time. Then they embrace these solutions and implement them without taking the time to focus, align, evaluate, or systematize their solution.

Many great ideas and inventions occur by accident, by discovery, or by one entity and another entity creating a new combination and systematically shaping the idea.

The electronic space recognizes the value of both accidental and intentional generation of ideas and solutions, and accommodates the best of both approaches by taking the creative process out of the traditional setting and making resource support available to everyone on a desktop computer, laptop computer, digital phone, personal data assistant, wireless devices, web-based TV, or other computing devices capable of connecting to the electronic space. Through direct interaction one can materialize new ideas, combinations, relationships, and solutions. Rather than a separate place, occupied at a scheduled time, driven by constraints and other influences that impede versus foster creativity, the electronic space becomes an extension of an individual's, team's, or organization's creative workshop; thereby enabling discovered ideas to develop, and solutions to evolve.

By providing a customized electronic space, a user can engage in each step of the problem solving process and have immediate access to selected resources to support and overcome obstacles that may arise in reaching a solution. Interaction and diversion are both available as well as security and privacy which can be tailored by the user to the degree desired. By providing such an electronic space and method for facilitating ideation, at a minimum, this will increase the speed at which a solution is arrived at and most likely will facilitate developing options which would not appear in a standard office environment. Having more options, and a support group to assist in considering leads to solutions results in better and more creative solutions which can foster individual development as well as the development of new products and services.

The hardware and software presently exists to create the electronic space and support it on a network and solely requires the implementation of the software in a form which allows access and customization of the electronic space, as described above.

The only equipment needed to access the electronic space would be a computer or net enabled device and access to the Intra-net or Internet where the electronic space would be located rendering the system readily available to users.

While preferred embodiments of the present invention have been described, it will be understood by those skilled in the art that various changes or modifications could be made without varying from the invention.

I claim:

1. A system for organizing and assembling information and resources for interaction with at least one user for facilitating creative problem solving, the system comprising:

a host/server disposed on a network;

a plurality of devices connectable to the host/server via the network;

means for generating a plurality of user configurable electronic spaces, each electronic space configured for computer based display as a virtual room on display devices of each of the plurality of users, the electronic room spaces supported on the network;

means for each user to configure an individualized room by selecting graphic, textual and application information and resources for display in the individualized room, each configured and displayed as selectable iconic images located in the individualized room, the configuration directed to facilitating generating one or more solutions to a problem defined by the user;

means for each user to access a respective individualized electronic room and means for actuating the selected iconic images for accessing the graphic, textual and application information and resources within the individualized electronic room space;

an intelligent agent application supported on the host/server which engages each user accessing each individualized electronic room, and directly interacts with each user by posing an engagement message for initiating an interactive discussion and by using a question/answer approach to test solutions to the problem, and to facilitate access to, selection of and delivery of resources relevant to each user for use in facilitating development of a solution of the problem defined by the user;

means for monitoring the intelligent agent and means for engaging a dispatcher for locating resources and tools for the user responsive to the intelligent agent;

means for storing and displaying the plurality of individualized electronic spaces, and, means for generating at least one common electronic room configured for computer generated display as a virtual room, and being accessible by two or more selected users, the common room configured by the selected users, and means for supporting interactive communication between the selected users within the common room, displayed on each selected user's local display device.

2. The system of claim 1 wherein the host server has processing means, communication means and storage means.

3. The system of claim 1 wherein the selected resources are selected from the group consisting of search engines, databases, experts, technical information, work processing applications, spread sheet applications, presentation applications, planning applications, and communication applications.

4. An electronic space supported on a network and being accessible by a user and configured for generating one or more solutions to a problem defined by the user, the electronic space comprising:

a computer generated image of a room viewable on a computer display device, the room image containing selected graphical and textual information visually displayed as decorative images or furnishing images within the room image, one or more images being settable as one or more iconic images activatable to access at least one selected resource or software application, each actively accessible selected resource or software application being usable within the room image for facilitating generating a solution to the problem defined by the user, wherein a user creates an interactive and individualized computer generated room image furnished with selected decorative images and selected furnishing images, an electronic intelligent agent application integrated with the electronic space and programmed for interaction with the user within the individualized electronic room space, the intelligent agent application engaging the user by posing an engagement message for initiating an interactive discussion and directly interacting with the user by generating questions and answers to test each problem solution, the intelligent agent programmed to facilitate access to, selection of and delivery of resources relevant to the user for use in facilitating development of a solution of the problem defined by the user, and, at least one iconic image representing means for engaging a dispatcher for locating resources and tools for the user, and, a computer generated image of a common room area simultaneously viewable on a plurality of display devices and being accessible by multiple users, and having means for the multiple users to be visually represented within the common room area for interactive communication therein.

5. The electronic space of claim 4 further comprising iconic images representing active transport links between a plurality of electronic room spaces, such that a user can move from one electronic room to another electronic room by actuating an associated transport link.

6. The electronic space of claim 5 wherein at least one active transport link image is selected from the group consisting of a door image, a window image, a painting image and a photograph image.

7. The electronic space of claim 4 wherein the electronic space is supported on the network by at least one data processing device having processing means, data storage means, communication means, and means to generate and display the room image.

8. A method for use of a computer based data processing system to facilitate computer supported generation of a solution to a problem defined by a user comprising:

providing a computer based data processing system;

using the computer based data processing system to generate an electronic space represented as a computer generated image of a room viewed on a computer display device;

configuring the electronic space to contain activatable links represented as icons within the room, the icons linked to a plurality of data resources, human resources and software applications the configuration directed to facilitating generating one or more solutions to the problem defined by the user;

selecting at least one activatable icon and linking to the resource selected by the user; and using the resource within the electronic room space;

providing an intelligent agent application programmed for direct communicative interaction with the user within the electronic room space;

using the intelligent agent application to view and select the activatable links for incorporation in the electronic room space, and to engage the user directly by posing an engagement message for initiating an interactive discussion and by using a question/answer approach to test solutions to the problem defined by the user, and to facilitate access to, selection of and delivery of resources relevant to the user for use in facilitating development of a solution of the problem defined by the user, using the intelligent agent to engage a dispatcher for locating resources and tools for the user, and, using the data processing system to generate a common electronic room space represented as an image of a meeting room on the display device, the common electronic room space simultaneously accessible and configurable by multiple users, each of which has a local display of the common electronic room space, and interacting within the meeting room.

9. The method of claim 8 further comprising communicating with designated recipients within the electronic room space, each recipient having a computer generated display of the room image on a local display device, the designated recipients interacting within the electronic room space.

10. The method of claim 8 further comprising using the intelligent agent application within the electronic room space to transform a user input and displaying the transformed user input within the electronic room space.

11. The method of claim 8 further comprising using the data processing system to generate user selected iconic representations of activatable links to user selected entertainment resources.

* * * * *